HUGH E. RIORDAN
INVENTOR.

BY S. A. Giarratana

ATTORNEYS

Feb. 22, 1966 H. E. RIORDAN 3,237,055
D.C. PULSE TORQUING SYSTEM EMPLOYING HALF-WAVE RECTIFIED A.C.
Filed Jan. 23, 1962 4 Sheets-Sheet 2

HUGH E. RIORDAN
INVENTOR.

BY
ATTORNEYS

Feb. 22, 1966  H. E. RIORDAN  3,237,055
D.C. PULSE TORQUING SYSTEM EMPLOYING HALF-WAVE RECTIFIED A.C.
Filed Jan. 23, 1962  4 Sheets-Sheet 4

HUGH E. RIORDAN
INVENTOR.

BY
ATTORNEYS

United States Patent Office 3,237,055
Patented Feb. 22, 1966

3,237,055
D.C. PULSE TORQUING SYSTEM EMPLOYING HALF-WAVE RECTIFIED A.C.
Hugh E. Riordan, Wyckoff, N.J., assignor to General Precision Inc., Little Falls, N.J., a corporation of Delaware
Filed Jan. 23, 1962, Ser. No. 168,162
15 Claims. (Cl. 317—123)

This invention relates to torquing in an inertial system, and more particularly to a system in which the torquer is energized by a train of high precision pulses.

Pulse torquing is a technique of energizing torquers in inertial systems. In pulse torquing the torquers are energized by trains of constant amplitude pulses instead of analog current values. Pulse torquing is used in place of torquing with an analog current because of its compatibility with digital operation. For example, when it is desired to produce a digital output from a torquer energized by an analog current value, an analog to digital conversion circuit is required. When pulse torquing is used, a digital output is obtained with much simpler circuitry. Furthermore, the use of pulse torquing eliminates torquer linearity as a primary factor in instrument accuracy. This result is achieved because the current-time envelope of each pulse (hereinafter referred to as the "impulse content") used to energize the torquer is identical. Only the algebraic sum of the number of pulses applied to the torquer varies with varying torque demands. The use of pulse torquing also eliminates the linearity requirements on the output of the torquer amplifier. Moreover, in many systems the linearity and scale factor stability of the pickoff are eliminated as direct factors in instrument accuracy when pulse torquing is used.

In systems making use of pulse torquing, it is necessary to control the impulse content of each pulse to a precision commensurate with the overall precision required of the instrument and to use pulse repetition frequencies sufficiently high to satisfy the required resolution and data rate. In addition, the gating of the pulses must be predictable and uniform. The present invention is directed toward the problems of obtaining this required precision and predictable uniform gating.

In the system of the present invention, the output of an oscillator, after being amplified, is rectified by a half wave rectifier. The resulting output pulse trains from the half wave rectifier will comprise sinusoidally shaped pulses spaced apart the interval of one half cycle of the oscillator output. This pulse train is applied to two gates, one of which is also an inverter. The outputs from the gates energize the torquer. The gates are selectively enabled by a circuit to control the energization of the torquer in accordance with the requiremnts of the inertial system. Because the pulses in the pulse train are sinusoidally shaped instead of being triangular or rectangular, the problem of transient voltages due to torquer inductance is relieved. The switching operations on the gates are performed during intervals between pulses. Because of this feature the gates are always fully turned on or fully turned off when the pulses are applied thereto. As a result the switching characteristics of the gates are not critical. Because the pulses in the train are spaced, the timing of the switching operations on the gates is not critical. Thus the present invention provides a pulse train having two very desirable characteristics for pulse torquing, that is sinusoidally shaped pulses and spaces between the pulses. This superior pulse train is achieved with the very simple circuitry comprising an oscillator in combination with an amplifier and a half wave rectifier.

In the system of the present invention, the pulses, after being applied to the torquer, are integrated in an improved square law integrator and the resulting integral is compared with a reference to produce an error signal. The error signal controls the gain of the amplification between the oscillator and the half wave rectifier so that the impulse content of the pulses is maintained constant.

It is important when pulse torquing is used that the pulses applied to the torquer to cause torquing in opposite directions be equal in impulse content. In one embodiment of the present invention, this equality is assured by a polarity switching operation carried out at a frequency which is a submultiple of the oscillator frequency. In the polarity switching operation the control of the pulse gates is reversed and at the same time the polarity of the torquer coil is reversed. As a result the output pulses from each gate will take turns in causing torquing in each direction and the effects of any inequality will be cancelled out.

In an alternative embodiment, the impulse content equality between pulses causing torquing in opposite directions is achieved by another supervisory circuit which periodically compares the positive and negative pulses to produce an error signal. This error signal is used to vary the amplitude of either the positive or negative pulses in a direction to eliminate the error signal.

Accordingly, a principal object of the present invention is to provide an improved pulse torquing system.

Another object of this invention is to improve the precision of the pulse formation in a pulse torquing system.

A further object of this invention is to generate an improved pulse train for a pulse torquing system.

A still further object of this invention is to improve the amplitude time envelope of the pulses used in a pulse torquing system.

A still further object of this invention is to simplify the circuitry for producing an improved pulse train in a pulse torquing system.

A still further object of this invention is to provide a pulse torquing system in which the impulse content is maintained constant.

A still further object of this invention is to maintain impulse content equality between pulses causing torquing in opposite directions in a pulse torquing system.

A still further object of this invention is to reduce the criticalness of the switching characteristics of the pulse gates in a pulse torquing system.

A still further object of this invention is to reduce the criticalness of the timing of the gating in a pulse torquing system.

A still further object of this invention is to provide an improved square law integrator for use in a pulse torquing system.

Further objects and advantages of the present invention will become readily apparent as the following detailed description of the invention unfolds and when taken in conjunction with the accompanying drawings, wherein.

Figure 1:
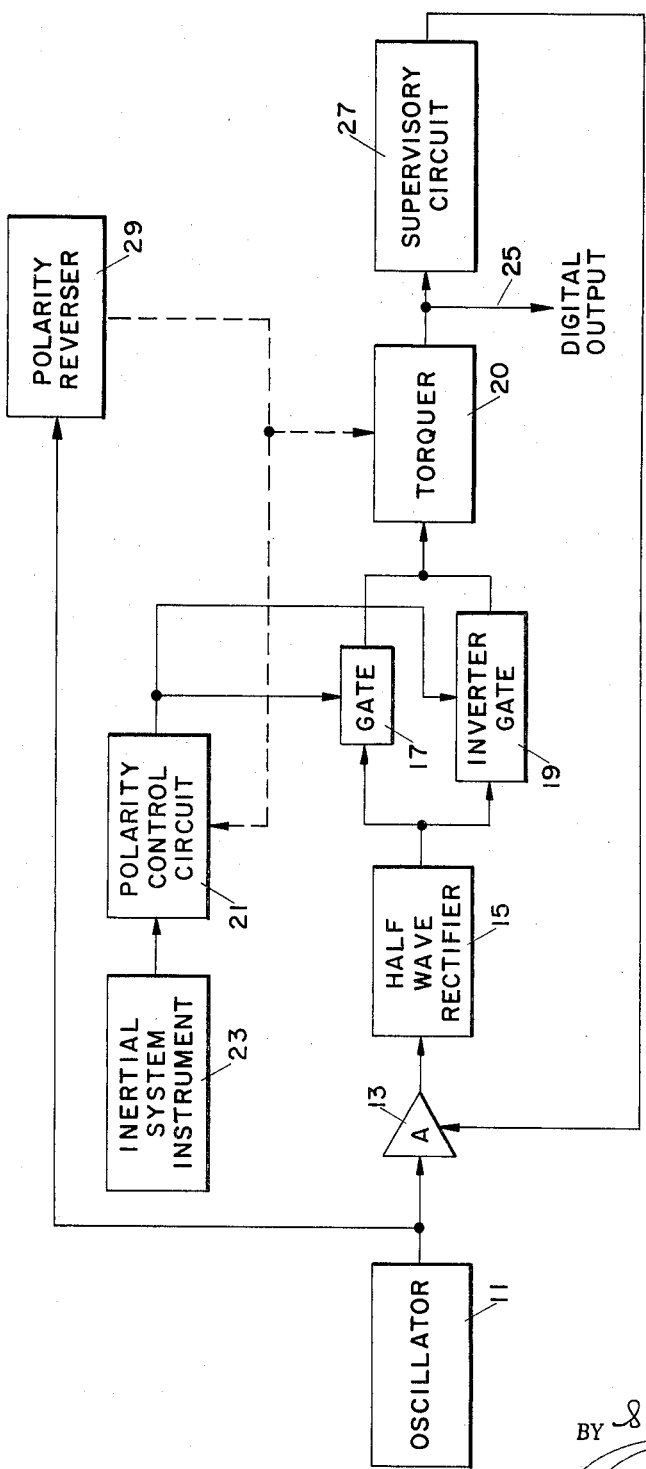
FIG. 1 is a block diagram of one embodiment of the invention.

As shown in FIG. 1, the pulse torquing system of the present invention comprises an oscillator 11, the output of which is amplified by a variable gain amplifier 13 and applied to the input of a half wave rectifier 15. The resulting output from the half wave rectifier 15 is a pulse train in which sinusoidally shaped pulses are produced at the oscillation frequency of the oscillator 11. The pulses in the pulse train produced by the half wave rectifier 15 are separated by intervals equal to one half cycle of the oscillation frequency of the oscillator 11. The pulse train is applied to a gate 17 and to an inverter gate 19. When the gate 17 is enabled it will pass the pulse train output of the rectifier 15 to a torquer 20. When the inverter gate 19 is enabled it will reverse the polarity of the pulses in the output pulse train of the rectifier 15 and pass the resulting pulse train with the inverted pulses to the torquer 20. The torquer 20 in response to receiving pulses from the gate 17 will apply a torque in one direction and the amount of torquing applied by the torquer 20 in this one direction will depend directly upon the number of pulses applied to the torquer 20 from the gate 17. The torquer 20, in response to receiving inverted pulses from the inverter gate 19, will apply a torque in the opposite direction and the amount of torquing carried out by the torquer 20 in this opposite direction will be directly proportional to the number of pulses applied to the torquer 20 from the inverter gate 19. The gates 17 and 19 are selectively enabled by a polarity control circuit 21 which operates in response to signals received from an instrument 23 of the inertial system in which the torquer 20 is used, for example from a gimbal takeoff. When the control circuit 21 receives a signal indicating that it is desired to apply a torque in one direction, it will enable the appropriate one of the gates 17 and 19 and when the polarity control circuit 21 receives a signal indicating that it is desired for the torquer 20 to apply a torque in the opposite direction, the polarity control circuit 21 will enable the other one of the gates 17 and 19. The gates 17 and 19 are bistable and each will remain either in a state in which it is enabled or a state in which it is not enabled until it receives a signal from the control circuit 21 causing it to switch. When the gate 17 is enabled the gate 19 will be disenabled, and vice versa. A positive signal applied to the gates 17 and 19 from the control circuit 21 will cause the gate 17 to become enabled and cause the gate 19 to become disenabled and a negative signal applied to the gates 17 and 19 from the control circuit 21 will cause the gate 17 to become disenabled and the gate 19 to become enabled. The polarity control circuit 21 senses only the polarity of the output signal produced by the inertial system instrument 23 and then selects the appropriate one of the gates 17 and 19 in accordance with this polarity. The selected gate will remain enabled until the torquing action by the torquer 20 in response to the pulse train applied by the selected gate causes the output signal from the inertial system instrument 23 applied to the polarity control circuit 21 to reverse its polarity. Because the pulse torquing system operates only in response to the polarity of the output signal of the instrument 23, the linearity of the output signal of the instrument 23 is not important.

The torquer 20, after operating in response to the pulses applied from the gates 17 and 19, passes these pulses on to an output chanel 25. The pulses thus applied to the output channel 25 comprise a digital output representing the amount and direction of the torquing carried out by the torquer 20. The pulses passed on by the torquer 20 are also applied to a supervisory circuit 27, which detects changes in the impulse content of the applied pulses and in response thereto controls the gain of the variable gain amplifier 13 to eliminate any changes in impulse content, thereby maintaining the impulse content of the pulses applied to the torquer 20 constant. The supervisory circuit 27 detects changes in the impulse content of the applied pulses by integrating these pulses with a square law integrator and comparing the resulting integral with a reference to generate an error signal which is used to control the gain of the amplifier 13.

The system shown in FIG. 1 is also provided with a polarity reverser 29 which performs a cyclical switching operation at a frequency which is a submultiple of the oscillation frequency of the oscillator 11. The output signal of the oscillator 11 is applied to the polarity reverser 29 to synchronize the operation of the polarity reverser with the oscillation frequency of the oscillator 11. The polarity reverser 29 cyclically reverses the control of the gates 17 and 19 by the polarity control circuit 21. To understand what happens when the control of the gates 17 and 19 by the circuit 21 is reversed, let it be assumed that at a given time in the cyclical operation of the polarity reverser the circuit 21 applies a positive signal to the gates 17 and 19 in response to the output signal of the instrument 23 being of a first polarity and applies a negative signal to the gates 17 and 19 in response to the output signal of the instrument 23 being of the opposite polarity. Then after the control of the gates 17 and 19 by the circuit 21 is reversed, the circuit 21 applies a negative signal to the gates 17 and 19 in response to the output signal of the instrument 23 being of the first polarity and applies a positive signal to the gates 17 and 19 in response to the output signal of the instrument 23 being of the opposite polarity. At the same time that the polarity reverser cyclically reverses the control of the gates 17 and 19 by the circuit 21, it also reverses the polarity of the coil of the torquer 20 in synchronism with the reversal of the control of the gates 17 and 19 by the circuit 21. As a result, the torquer 20 will apply a torque only in one direction in response to an output signal of the first polarity from the instrument 23 and will only apply a torque in the opposite direction in response to a signal of the opposite polarity produced by the instrument 23 throughout the cycling by the polarity reverser. The effect of the polarity reverser is to cause the gates 17 and 19 to take turns causing torquing in each direction so that any inequality in impulse content in the output pulse trains from the gates 17 and 19 is cancelled out.

Figure 2:
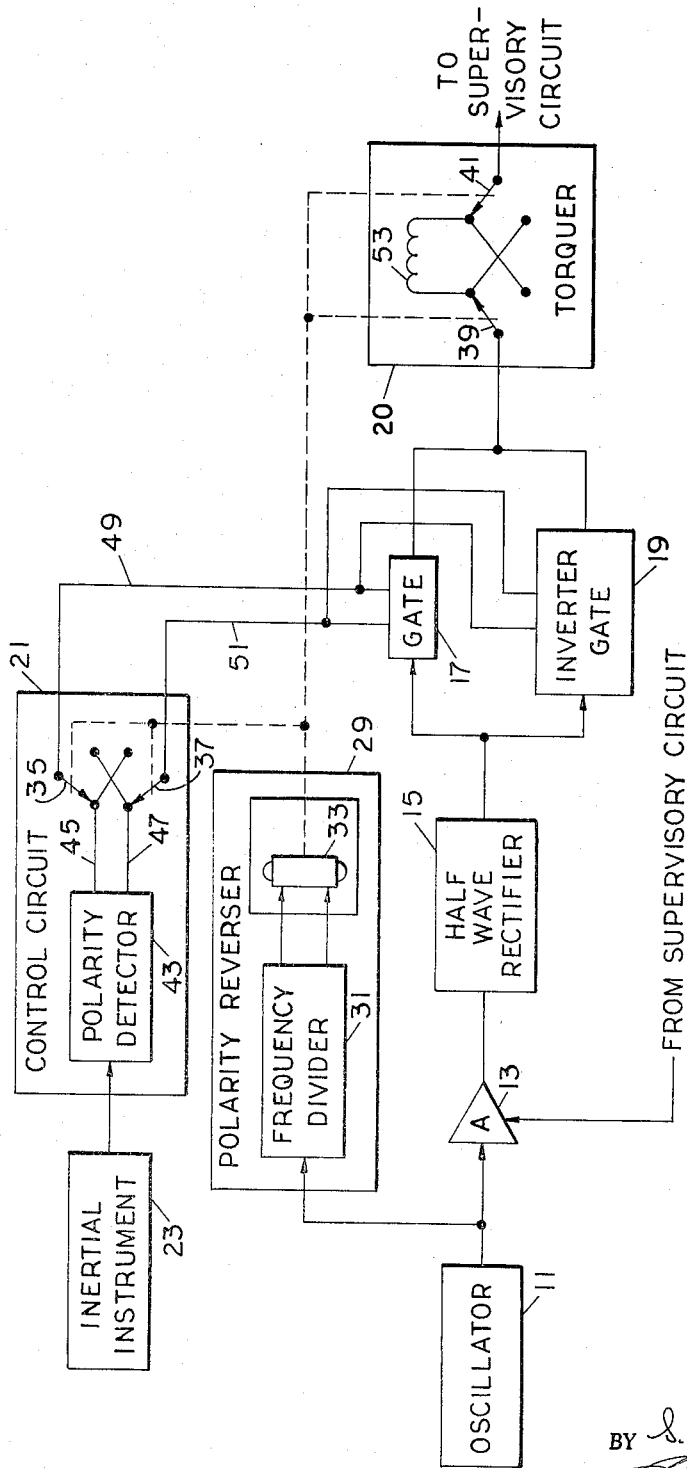
FIG. 2 is a diagram illustrating the system of FIG. 1 in more detail.

FIG. 2 illustrates the system with the polarity reverser and its cooperation with the control circuit and the torquer illustrated in more detail. As shown in FIG. 2, the output from the oscillator 11 applied to the polarity reverser 29 is divided by a frequency divider 31, which cyclically energizes a solenoid 33 at a submultiple of the oscillation frequency of the oscillator 11. The output from the frequency divider 31 energizing the solenoid 33 is such that the solenoid 33 will be energized for one half of each cycle and not energized for the other half of each cycle. The solenoid 33 controls the position of two switches 35 and 37 connected with the control circuit 21 and two switches 39 and 41 connected with the coil 53 of the torquer 20. The control circuit 21 also includes a polarity detector 43 which detects the polarity of the output signal of the instrument 23 and then produces a corresponding polarity output signal to enable one of the gates 17 and 19. The polarity detector 43 produces its output signal voltage across a pair of lines 45 and 47. When the output from the instrument 23 is of a first polarity, then the polarity selector 43 will make the line 45 positive with respect to line 47 and when the output signal from the instrument 23 is of the opposite polarity, in response thereto the polarity detector 43 will make the line 47 positive with respect to the line 45. The polarity detector 43 includes a null crossing detector and reverses the polarity of its output voltage produced across lines 45 and 47 when a null crossing by the output signal of the instrument 23 occurs. When the switches 35 and 37 are in the position shown in FIG. 2 as a result of the solenoid 33 not being energized, the line 45 will be connected through the switch 35 to a line 49 and the line 47 will be connected through the switch 37 to a line 51. When the solenoid 33 is energized, the switches 35 and 37 will move to the alternate positions in which the switch 35 connects the line 47 to the line 49 and the switch 37 connects the line 45 to the line 51. The switches 35 and 37 thus constitute a double-pole double-throw reversing switch. The lines 49 and 51 are connected to the enabling inputs of the gates 17 and 19. The voltage output from the control circuit 21 is considered positive when the line 49 is positive with respect to line 51 and is considered negative when the line 49 is negative with respect to line 51. Thus when the switches 35 and 37 are in the position shown in FIG. 2 as a result of the solenoid 33 not being energized and the polarity selector 43 makes the line 45 positive with respect to the line 47, the gate 17 will be enabled and the gate 19 will be disenabled. Likewise when the solenoid 33 is not energized so that the switches 35 and 37 are in the position shown and the polarity detector 43 makes line 45 negative with respect to line 47, the gate 19 will be enabled and the gate 17 will be disenabled. When the solenoid is energized in the alternate periods of each cycle of the output from the frequency divider 31, and the polarity detector 43 makes the line 45 positive with respect to the line 47, the gate 19 will be enabled and the gate 17 will be disenabled, and similarly in response to the line 47 being positive with respect to the line 45 when the solenoid 33 is energized, the gate 17 will be enabled and the gate 19 will be disenabled. Thus it will be seen that the gates 17 and 19 take turns being enabled in response to both polarity output signals from the instrument 23. The switches 39 and 41 connected with the torquer coil 53 will be in the position shown when the solenoid 33 is not energized and will be switched to the opposite position when the solenoid is energized. The switches 39 and 41 are connected as a double-pole double-throw reversing switch connected to reverse the polarity of the coil 53. As a result the pulses from the gate 17 applied to the torquer 20 will flow in an opposite direction through the torquer coil 53 when the solenoid 33 is energized than when the solenoid 33 is not energized. Similarly, the pulses from the gate 19 will flow in the opposite direction through the torquer coil 53 when the solenoid 33 is energized than when it is not energized. Because of this reversing of the polarity of the torquer coil 53, the direction in which the torquer 20 applies its torque in response to the output signal of the instrument 23 does not change when the solenoid 33 changes from an energized condition to a condition of being not energized, or vice versa, even though the polarity of the pulses applied to the torquer 20 reverses as a result of the switching of the control of the gates 17 and 19 by the circuit 21. The gates 17 and 19 each contain blocking circuits which prevent the gates 17 and 19 from being switched from one state to another by a change in polarity of the voltage between lines 49 and 51 simultaneously with the application of a pulse from the rectifier 15 to the gates 17 and 19. As a result the gates 17 and 19 switch from one state to the other only in the dead periods between pulses in the pulse train produced by the rectifier 15 and pulse splitting is prevented. Moreover, the gates 17 and 19 will each be fully enabled or disenabled as each pulse is applied to the gates 17 and 19. Therefore the switching characteristics of the gates 17 and 19 are not critical and only the characteristic of the gates 17 and 19 when they are fully enabled or disenabled is important.

Figure 3:
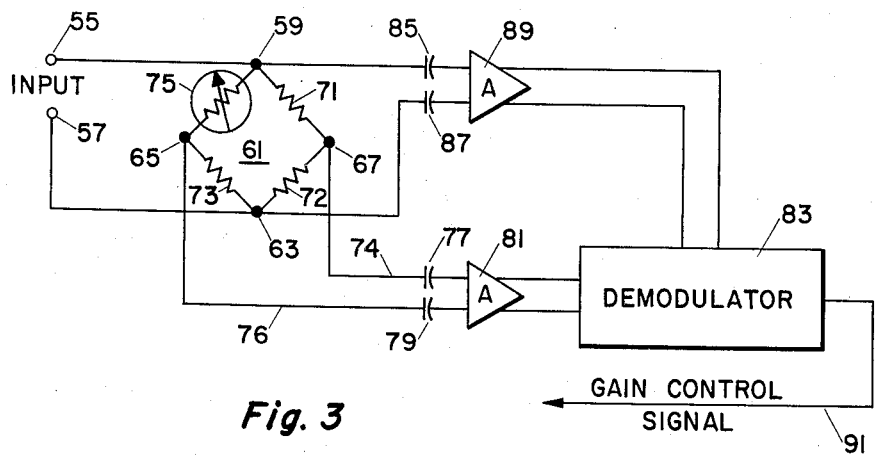
FIG. 3 is a circuit diagram of a supervisory circuit used in the present invention.

The details of the supervisory circuit are shown in FIG. 3. The pulses from the gates 17 and 19, after passing through the torquer coil 53, are applied across the input terminals 55 and 57 of the supervisory circuit. The terminal 55 is connected directly to a terminal 59 of a bridge 61 and the terminal 57 is connected to a terminal 63 of the bridge 61 opposite the terminal 59. Thus the pulses from the gates 17 and 19, after passing through the torquer coil 53, are applied across terminals 59 and 63 of the bridge 61. The bridge 61 also comprises a pair of output terminals 65 and 67. Reference resistor 71, 72 and 73 of constant resistance are connected in the bridge 61 between the terminals 59 and 67, 67 and 63, and 63 and 65, respectively. A square law integrating resistance element 75 is connected in the bridge 61 between the terminal 59 and the terminal 65. The bridge produces its output across lines 74 and 76 connected to terminals 67 and 65, respectively. The resistance of the element 75 will vary as the square of the integral of the current passing through it. Since the element 75 is connected in series with the resistor 73 between the terminals 59 and 63, the current flowing through it will be proportional to the pulses applied across input terminals 55 and 57 and therefore the resistance of the element 75 will vary as the integral of the square of the pulses applied to the torquer coil 53. The values of the resistors 71 and 72 connected between terminals 59 and 63 in series are selected relative to the value of the resistor 73 such that when the impulse content of the pulses applied to the torquer coil 53 are at their desired value, the resistance of the element 75 will be such that the voltage between the terminals 65 and 67 will be at null as each pulse is applied to the bridge 61. When the positive pulses from the gate 17 are being applied to the torquer 20 and the impulse content of these pulses is too high, the resistance of the element 75 will become too high, and as a result the terminal 67 will become positive with respect to the terminal 65 as each pulse is applied to the bridge 61. The resulting pulses of this polarity produced across lines 74 and 76 are designated positive pulses. Similarly when the impulse content of the positive pulses applied to the torquer 20 from the gate 17 is too low, the resistance of the element 75 will be too low and the output terminal 65 of the bridge 61 will be positive with respect to the terminal 67 as each pulse is applied to the bridge 61. The resulting pulses produced across lines 74 and 76 are designated negative pulses. Thus when positive pulses are applied to the torquer 20 from the gate 17, positive pulses will be produced across lines 74 and 76 whenever the impulse content of the pulses applied to the torquer 20 is too high and negative pulses will be produced across the lines 74 and 76 whenever the impulse content of the pulses applied to the torquer 20 is too low. When negative pulses are applied to the torquer 20 from the inverter gate 19 and the impulse content is too high, the resistance of the element 75 will be above the desired value, but because of the polarity of these pulses the terminal 65 will be made positive with respect to the terminal 67 as each pulse is applied to the bridge network 61 and negative pulses will be produced across lines 74 and 76. Similarly, when the impulse content is too low, causing the resistance of the element 75 to drop below the desired value, the terminal 67 will be positive with respect to the terminal 65 and positive pulses will be produced across lines 74 and 76. Thus the bridge network 61 in response to the pulses applied to the torquer 20 from the inverter gate 19 having too much impulse content will produce negative pulses across lines 74 and 76 and in response to pulses applied to the torquer 20 from the inverter gate 19 having too little impulse content will produce positive pulses across lines 74 and 76. Thus it will be noted that the bridge network 61 produces pulses across lines 74 and 76 in response to the impulse content of the output pulses of the inverter gate 19 being too high of the opposite polarity to that produced in response to the impulse content of the output pulses of the gate 17 being too high, and likewise the bridge network 61 produces pulses across lines 74 and 76 in response to the impulse content of the output pulses of the inverter gate 19 being too low of the opposite polarity to that produced in response to the impulse content of the output pulses of the gate 17 being too low. The pulses produced across lines 74 and 76 are applied through capacitors 77 and 79 to an amplifier 81 where they are amplified and applied to a demodulator 83. The pulses from the torquer 20 applied across terminals 55 and 57 in addition to being applied across terminals 59 and 63 of the bridge 61 are also applied through capacitors 85 and 87 to an amplifier 89, which amplifies these pulses and applies them to the demodulator 83. The demodulator 83 produces a signal voltage on an output channel 91 proportional to the amplitude of the pulses applied thereto from the amplifier 81. The polarity of the signal produced on the output channel 91 will depend upon both the polarity of the pulses applied from the amplifier 81 and the polarity of the pulses applied to the demodulator 83 from the amplifier 89. When positive pulses are applied to the demodulator 83 from the amplifier 89 as a result of the pulses originating from the gate 17, then the demodulator 83 will produce a positive signal voltage on channel 91 in response to positive pulses being applied from the amplifier 81 and will produce a negative signal voltage in response to negative pulses being applied from the amplifier 81. Thus when the pulses applied to the supervistory circuit originate from the gate 17, the demodulator 83 will produce a positive voltage on channel 91 in response to the impulse content of the pulses produced by the gate 17 being too low, and will produce a negative voltage on channel 91 in response to the impulse content of the pulses produced by the gate 17 being too high. When the demodulator 83 receives negative pulses from the amplifier 89 indicative of the fact that the pulses originated from the inverter gate 19, then demodulator 83 will produce a negative voltage on channel 91 in response to receiving positive pulses from the amplifier 81 and will produce a positive voltage on channel 91 in response to receiving negative pulses from the amplifier 81. Thus when the pulses applied to the supervisory circuit originate from the inverter gate 19, the demodulator 83 will produce a positive voltage on channel 91 in response to the impulse content of the pulses being too low and will produce on channel 91 a negative voltage in response to the impulse content being too high. Thus the demodulator 83 produces a positive voltage on channel 91 whenever the impulse content of the pulses is too low and a negative voltage whenever the impulse content of the pulses is too high, regardless of whether the pulses originate from the gate 17 or the gate 19. The voltage on channel 91 is applied to the gain control input of the amplifier 13 to control the gain thereof and maintain the impulse content of the pulses constant. Whenever the impulse content of the pulses starts to rise, the demodulator 83 will produce a negative voltage on channel 91 decreasing the gain of the amplifier 13 and counteracting this rise in impulse content. Similarly, whenever the impulse content of the pulses applied to the torquer 20 starts to drop, the demodulator 83 will produce a positive voltage on channel 91 increasing the gain of the amplifier 13 and counteracting the drop in impulse content. In this manner the impulse content of the pulses is maintained substantially constant.

Figure 4:
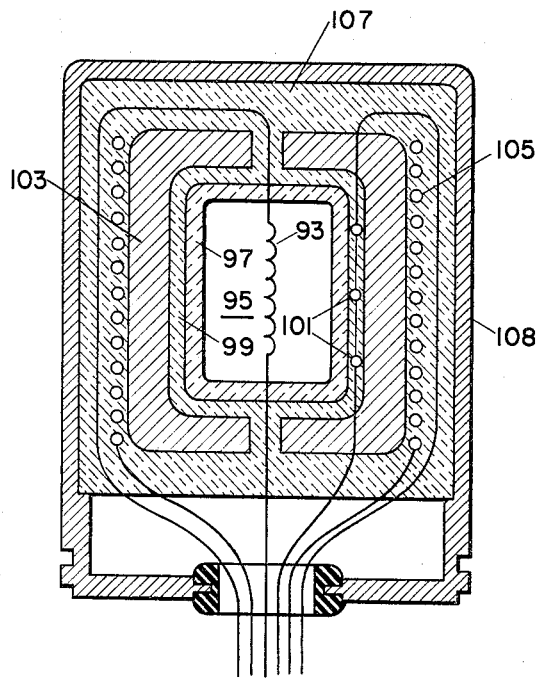
FIG. 4 is a sectional view of a square law integrator used in the present invention.

The detailed structure of the square law integrating resistance element 75 is illustrated in the sectional view shown in FIG. 4. As shown in FIG. 4, the square law integrator comprises a resistance wire 93, which is made out of a material having a predictable temperature coefficient of resistance. The wire 93 is what is electrically connected between the terminals 59 and 65 of the bridge 61. The ambient temperature around the wire 93 is maintained constant by the encapsulating structure shown in FIG. 4. When the ambient temperature is maintained constant, the temperature of the wire 93 will be a function of the integral of the square of the current passing through it. Since the wire 93 has a predictable temperature coefficient, the resistance of the wire 93 is a function of the integral of the square of the current passing through the wire 93. Thus the wire 93 will perform the desired function in the bridge network 61. To maintain the ambient temperature around the wire 93 constant, the wire 93 is placed in an evacuated chamber 95 defined by an envelope 97 of fused quartz. The quartz envelope 97 is embedded in and surrounded by a heat insulating material 99 which contains thermocouples 101. The assembly of the wire 93, the quartz envelope 97 and the heat insulating material 99 is cemented in the cavity of a massive aluminum case 103 around which a heating coil 105 is wound. The coil 105 and the aluminum case 103 are surrounded by heat insulating material 107 and the entire assembly is housed in a sealed metal outer case 108. The ambient temperature around the wire 95 is sensed by the thermocouples 101 and in response thereto the energizing current of the coil 105 is controlled to maintain the ambient temperature surrounding the wire 93 constant.

Figure 5:
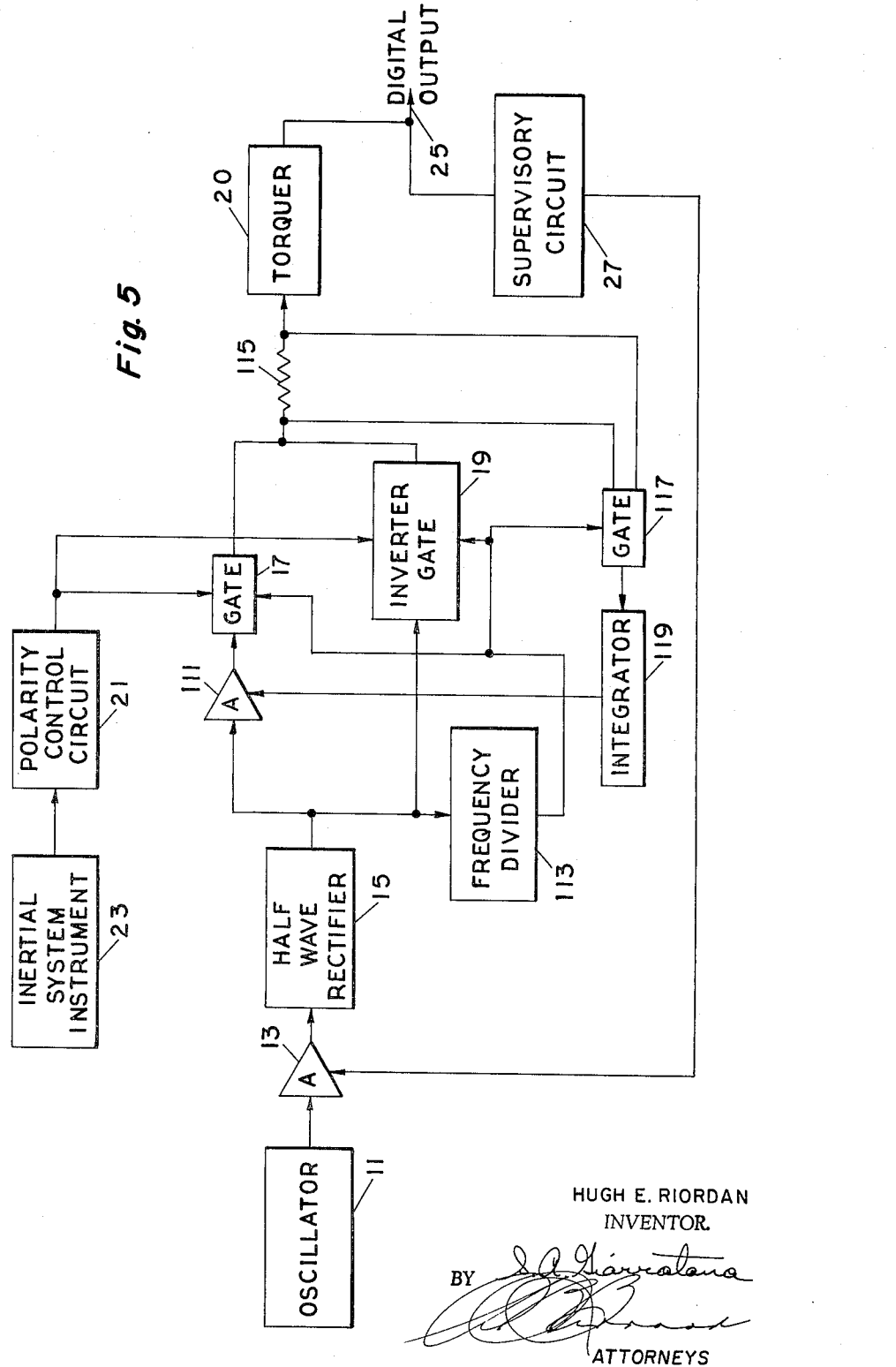
FIG. 5 is a block diagram of another embodiment of the invention.

FIG. 5 is a block diagram illustrating an alternative embodiment of the invention in which the impulse content of the positive and negaitve pulses are maintained equal by comparing the pulses in each channel. The system of FIG. 5 includes the same components as the system of FIG. 1 except that the polarity reverser 29 has been eliminated and an amplifier 111, a frequency divider 113, a resistor 115, an additional gate 117 and an integrator 119 have been added to the system. As shown in FIG. 5, the pulse train produced by the half wave rectifier 15 is amplified by the amplifier 111 before being applied to the gate 17. The pulse train from the half wave rectifier 15 is applied directly to the inverter gate 19 as in the system of FIG. 1. In the system illustrated in FIG. 5, the output from the half wave rectifier 15 is applied directly to a frequency divider 113, which periodically at a submultiple of the frequency of the oscillator 11 enables both the gates 17 and 19 at the same time. Thus positive and negative pulses are passed through the gates 17 and 19 at the same time to the torquer 20. Before being applied to the torquer 20, the pulses are combined and are passed over a resistor 115. If the impulse content of the pulses is equal, then they will cancel each other out, and no voltage will be produced across the resistor 115. If the pulses, however, are not equal, then when both of the gates 17 and 19 are enabled, pulses will be produced across the resistor 115. These pulses are applied to a gate 117, which is enabled by the frequency divider 113 only when the frequency divider 113 enables the gates 17 and 19. Pulses passing through the gate 117 are integrated by the integrator 119 which produces an output signal proportional to the integral of the pulses applied thereto passing through the gate 117. The output signal of the integrator 119 controls the gain of the amplifier 111. If the impulse content of the pulses passing through the gate 17 is greater than the impulse content of the pulses passing through the gate 19, then when the frequency divider 113 enables both the gates 17 and 19, positive pulses will pass through the gate 117 and be integrated by the integrator 119. In response thereto, the integrator 119 will change the signal voltage applied to the amplifier 111 in a direction to reduce the gain of the amplifier 111 until the impulse content of the pulses passing through the gates 17 and 19 is again equal. If the impulse content of the pulses passing through the gate 19 is greater than the impulse content of the pulses passing through the gate 17, then when the frequency divider 113 enables both the gates 17 and 19, negative pulses will be generated across the resistor 115, pass through the gate 117, and be integrated by the integrator 119. The integrator 119, in response to these negative pulses, will change the voltage applied to the gain control input of the amplifier 111 in a direction to increase the gain of the amplifier 111 until the impulse content of the pulses passing through both gates 17 and 19 is equal. In this manner the impulse content of the pulses passing through the gates 17 and 19 is automatically corrected to maintain equality.

The above description is of preferred embodiments of the invention, and many modifications may be made thereto without departing from the spirit and scope of the invention, which is defined in the appended claims.

What is claimed is:

1. A pulse torquing system comprising means to generate an A.C. signal, a half wave rectifier connected to rectify said A.C. signal, a torquer, first gating means operable to energize said torquer with the output of said half wave rectifier, and second gating means operable, alternately with said first gating means, to invert the output of said rectifier and energize the torquer with the resulting inverted output.

2. A pulse torquing system comprising a torquer including a torquer coil, gating means to energize said torquer coil with a first train of pulses of one polarity in response to a first signal and to energize said torquer coil with a train of pulses of the opposite polarity in response to a second signal, control means operable in a first state to apply said first signal to said gating means in response to a third signal, and to apply said second signal to said gating means in response to a fourth signal and operable in a second state to apply said first signal to said gating means in response to said fourth signal and to apply said second signal to said gating means in response to said third signal, and polarity reversing means to cyclically switch said control means between said first and second states and switch the polarity of said torquer coil simultaneously and synchronously with the switching of said control means at a frequency lower than the pulse frequency in said pulse trains.

3. A pulse torquing system comprising means to generate an A.C. signal, a half wave rectifier connected to rectify said A.C. signal, a torquer, a gate having its output connected to energize said torquer and its input connected to receive the output from said half wave rectifier, and means, including a blocking circuit in said gate, to selectively enable said gate, operable to switch said gate between the states in which it is enabled and which it is disenabled only during the periods between the pulses applied to said gate from said rectifier.

4. A pulse torquing system comprising means to generate an A.C. signal, a half wave rectifier connected to rectify said A.C. signal, a torquer, first gating means operable when enabled to energize said torquer with the output of said half wave rectifier, second gating means operable when enabled to invert the output of said rectifier and energize said torquer with the resulting inverted output, means to alternately enable said first and second gating means operable to switch said first and second gating means between the states in which they are enabled and disenabled only during the periods between the pulses in the output of said half wave rectifier.

5. A pulse torquing system comprising means to generate an A.C. signal, a half wave rectifier connected to rectify said A.C. signal, a torquer, a gate having its output connected to energize said torquer and its input connected to receive the output pulse train from said rectifier, means to selectively enable said gate, and means responsive to the impulse content of pulses applied to said torquer to change the amplitude of the pulses applied to said torquer in a direction to counteract such changes in impulse content.

6. A pulse torquing system comprising a torquer, means selectively operable to energize said torquer with a train of pulses, means to produce an output signal varying in accordance with the integral of the square of the amplitude of the pulses energizing said torquer, and means responsive to changes in said signal to change the amplitude of the pulses applied to said torquer in a direction to counteract such changes in said signal.

7. A pulse torquing system comprising a torquer, means selectively operable to energize said torquer with a train of pulses, a wire connected to be heated by said pulses, means to maintain the ambient temperature around said wire constant, and means responsive to changes in the temperature of said wire to change the amplitude of the pulses energizing said torquer in a direction to counteract such changes in temperature.

8. A pulse torquing system comprising a torquer, means selectively operable to energize said torquer with a train of pulses, a bridge network having first, second, third and fourth terminals, a constant resistance connected between said first and second terminals, a constant resistance connected between said second and third terminals, a constant resistance connected between said third and fourth terminals, and a resistance wire connected between said fourth and first terminals, said resistance wire having a temperature varying in accordance with the current flowing therethrough and a resistance varying in accordance with the temperature thereof, circuit means to apply the pulses energizing said torquer between said first and third terminals, and means responsive to changes in amplitude of the resulting pulses produced between said second and fourth terminals to change the amplitude of the pulses energizing said torquer in a direction to counteract such changes in amplitude of pulses produced between said second and fourth terminals.

9. A pulse torquing system comprising a torquer, means selectively operable to energize said torquer with a train of pulses, a bridge network having first, second, third and fourth terminals, a constant resistance connected between said first and second terminals, a constant resistance connected between said second and third terminals, a constant resistance connected between said third and fourth terminals, a resistance wire connected between said fourth and first terminals, an evacuated envelope enclosing said resistance wire, and means to maintain the ambient temperature around said envelope constant, said resistance wire having a temperature varying in accordance with the current flowing therethrough and a resistance varying in accordance with the temperature thereof, circuit means to apply the pulses energizing said torquer between said first and third terminals, means responsive to changes in amplitude of the resulting pulses produced between said second and fourth terminals to change the amplitude of the pulses energizing said torquer in a direction to counteract such changes in amplitude of pulses produced between said second and fourth terminals.

10. A pulse torquing system comprising a torquer, first gating means operable when enabled to produce output pulses of one polarity, second gating means operable when enabled to produce output pulses of the opposite polarity, means to apply the output pulses of said first and second gating means to said torquer means to alternately enable said first and second gating means, means to periodically simultaneously enable both said first and second gating means, means to generate a signal representing the difference in impulse content between the output pulses of said first and second gating means when said gating means are simultaneously enabled, and means responsive to said signal to change the amplitude of the output pulses of said first gating means in a direction to reduce said signal to a minimum.

11. A pulse torquing system comprising a torquer, means selectively operable to energize said torquer with a train of pulses, a bridge network having serially arranged first, second, third and fourth terminals, respective constant resistance means connected between said first and second, second and third, and third and fourth terminals, and additional resistance means connected between said first and fourth terminals, said additional resistance means having a temperature varying in accordance with the current flowing therethrough and a resistance varying in accordance with the temperature thereof, circuit means to apply the pulses energizing said torquer between said first and third terminals, and means responsive to changes in amplitude of the output between said second and fourth terminals to change the amplitude of the pulses energizing said torquer in a direction to counteract such changes in amplitude of said output.

12. A pulse torquing system comprising:
means to generate an A.C. signal;
a half-wave rectifier connected to rectify said A.C. signal and produce a series of pulses;
a torquer;
a gate and an inverter gate electrically connected in parallel between said rectifier and torque;

polarity-control circuit means electrically connected to, and controlling, said gates, said circuit means having an input and being adapted to respond to the polarity of input signals applied to said input to alternately enable and disable said gates in accordance with polarity changes in said applied signal, whereby inverted and un-inverted energizing pulses are selectively fed through said gates to said torquer; and additional circuit means, electrically connected between said torquer and A.C. signal-generating means, for detecting variations in the impulse content of the energizing pulses supplied to said torquer and affecting amplitude changes in said A.C. signal adapted to counteract said variations.

13. A pulse torquing system, according to claim 12, wherein said torquer includes a torquing coil, said system further including polarity reversing circuit means having an input connected to said A.C. signal-generating means and an output connected to said torquer coil and to said polarity-control circuit means, said reversing circuit means being operative cyclically to reverse the polarity of said torquer coil and, simultaneously, to invert the gate-control response of said control circuit means relative to the polarity of the signal applied to the control circuit input.

14. A pulse torquing system according to claim 12, including circuit means for periodically, simultaneously enabling said gate and inverter gate at a frequency which is a submultiple of said A.C. signal;

amplifier means selectively operable to vary the amplitude of pulses through one only of said gates;

means for deriving a pulse signal proportional to any difference in impulse content between pulses through said gates during the period when both are simultaneously enabled; and circuit means electrically coupling said amplifier and pulse-signal-deriving means to operate the amplifier means to adjust the amplitude of pulses through said one gate by an amount and in a direction to eliminate said pulse signal.

15. A pulse torquing system, comprising:

means to generate an A.C. signal;

a half-wave rectifier connected to rectify said A.C. signal and produce a series of pulses;

a gate and an inverter gate electrically connected in parallel between said rectifier and torquer;

polarity control circuit means electrically connected to, and controlling, said gates, said circuit means having an input and being adapted to respond to the polarity of input signals applied to said input to alternately enable and disable said gates in accordance with polarity changes in said applied signal, whereby inverted and un-inverted energizing pulses are selectively fed through said gates to said torquer;

additional circuit means, electrically connected between said torquer and A.C. signal-generating means, for detecting variations in the impulse content of the energizing pulses supplied to said torquer and affecting amplitude changes in said A.C. signal to counteract said variations;

a variable gain amplifier in series with one of said gates;

resistive impedance means electrically connected between the outputs of said gates and the input of said torquer;

an additional gate having an input connected across said impedance means;

integrator circuit means electrically connected between the output of said additional gate and said variable gain amplifier, said integrator circuit means being operative to vary the gain of the amplifier by an amount and in a direction dependent upon the magnitude and polarity, respectively, of an output signal from said additional gate; and frequency divider circuit means having an input electrically connected to the output of said rectifier and an output electrically connected to each of said gates, said frequency divider circuit means generating periodically, at a submultiple of the frequency of said A.C. signal, a control signal effective to enable all of said gates simultaneously.

References Cited by the Examiner

UNITED STATES PATENTS

| | | | |
|---|---|---|---|
| 2,499,144 | 2/1950 | Jarvis | 340—233 X |
| 2,563,902 | 8/1951 | Yost | 328—95 |
| 2,643,333 | 6/1953 | Jacobsen | 328—95 X |
| 2,812,483 | 11/1957 | Jones et al. | 318—28 |
| 2,814,005 | 11/1957 | Howell et al. | 318—28 |
| 2,837,618 | 6/1958 | Gildart | 338—22 |
| 2,854,851 | 10/1058 | Hurlburt et al. | 74—5.47 |
| 2,892,970 | 6/1959 | Sims | 317—123 |
| 2,964,682 | 12/1960 | Jansen | 317—8 |
| 2,977,558 | 3/1961 | Hampton | 338—22 |
| 2,986,943 | 6/1961 | Lair et al. | 74—5.4 |
| 3,079,539 | 2/1963 | Guerth | 318—28 |

OTHER REFERENCES

Solid State Products Inc.: Publication, "Applications and Circuit Design Notes," bulletin D420–02–12–59; FIGS. 6 and 7, page 8.

SAMUEL BERNSTEIN, *Primary Examiner.*

LLOYD M. McCOLLUM, *Examiner.*

D. YUSKO, R. V. LUPO, *Assistant Examiners.*